United States Patent
Seki et al.

(10) Patent No.: US 8,390,222 B2
(45) Date of Patent: Mar. 5, 2013

(54) BRUSHLESS MOTOR DRIVING CIRCUIT

(75) Inventors: Kunio Seki, Tokyo (JP); Kazutaka Inoue, Kyoto (JP); Hiroyuki Kikuta, Kyoto (JP); Yuichi Ohkubo, Gunma (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 459 days.

(21) Appl. No.: 12/720,830

(22) Filed: Mar. 10, 2010

(65) Prior Publication Data

US 2010/0237816 A1 Sep. 23, 2010

(30) Foreign Application Priority Data

Mar. 19, 2009 (JP) ................. 2009-067882

(51) Int. Cl.
*H02P 6/00* (2006.01)
*H02P 6/14* (2006.01)

(52) U.S. Cl. ......... 318/400.01; 318/400.28; 318/400.29; 327/309; 327/312; 327/321; 327/328

(58) Field of Classification Search ............ 318/400.01, 318/400.28, 400.29; 327/309, 312, 321, 327/328

See application file for complete search history.

(56) References Cited

U.S. PATENT DOCUMENTS

| 5,986,493 A * | 11/1999 | Li .................. 327/328 |
| 6,762,576 B2 | 7/2004 | Miyazaki et al. |
| 2004/0017168 A1 | 1/2004 | Miyazaki et al. |
| 2008/0018366 A1* | 1/2008 | Hanna .............. 327/112 |

FOREIGN PATENT DOCUMENTS

| JP | 3022893 A | 1/1991 |
| JP | 2771605 B2 | 7/1998 |
| JP | 4084117 B2 | 2/2004 |
| JP | 2004064863 A | 2/2004 |

* cited by examiner

*Primary Examiner* — Walter Benson
*Assistant Examiner* — Erick Glass
(74) *Attorney, Agent, or Firm* — Taft Stettinius & Hollister LLP (57) ABSTRACT

The present disclosure provides a brushless motor driving circuit capable of clamping an output voltage at a proper voltage, even when a power source voltage changes. Namely, a pre-driver circuit generates a voltage for driving a brushless motor from a source voltage by turning on/off first and second PMOS transistors and first and second NMOS transistors in an H bridge circuit of a drive voltage generating circuit, and applies the voltage to a coil of the brushless motor. A first clamp circuit turns on/off the first NMOS transistor on the ground side so that the output voltage at a first output terminal becomes equal to or lower than the source voltage. A second clamp circuit turns on/off the second NMOS transistor on the ground side so that output voltage at a second output terminal becomes equal to or lower than the source voltage.

2 Claims, 7 Drawing Sheets

BRUSHLESS MOTOR DRIVING CIRCUIT

CROSS-REFERENCE TO RELATED APPLICATIONS

This application is based on and claims priority under 35 U.S.C. §119 from Japanese Patent Application No. 2009-067882, filed on Mar. 19, 2009, the disclosure of which is incorporated by reference herein.

RELATED ART

1. Field of the Disclosure

The disclosure relates to a brushless motor driving circuit. Particularly, the present disclosure relates to a brushless motor driving circuit including a clamp circuit that clamps an output voltage output to a coil of a brushless motor.

2. Description of the Related Art

Figure 5:
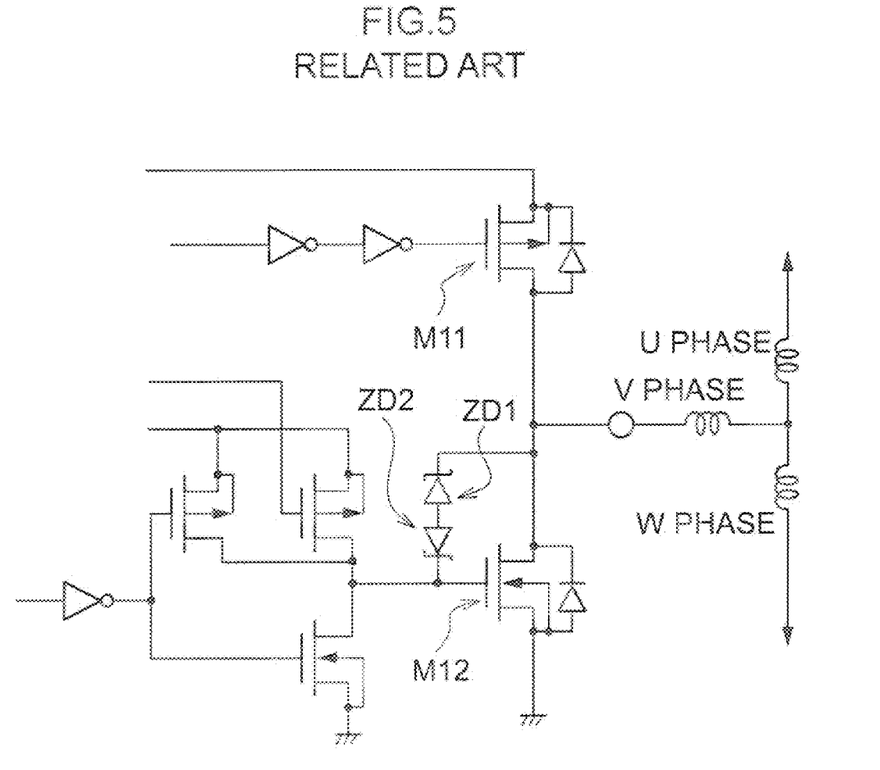
FIG. 5 is a circuit diagram showing the configuration of a clamp circuit of a motor driving circuit in a related art.

Recently, a clamp circuit of a motor driving circuit has been known (for example, Japanese Patent No. 4,084,117). For example, as shown in FIG. 5, in a three-phase motor circuit, a clamp circuit using a zener breakdown voltage of a zener diode has been known. In this clamp circuit, a PMOS transistor M11 and an NMOS transistor M12 with complementary output is used to drive a motor.

In this clamp circuit, for example, when both of the PMOS transistor M11 and the NMOS transistor M12 are turned off, at the time of phase switching of current passage to a motor, a kickback output is generated as an output voltage. When the output voltage becomes "Vz (zener breakdown voltage of the zener diode)+VF (forward voltage of about 0.7 V of the diode)", a zener diode ZD1 and a diode ZD2 are conducted. Further, when the diodes are conducted, a voltage exceeding a threshold voltage may be supplied to the gate of the NMOS transistor M12.

The threshold voltage of the gate voltage of the NMOS transistor M12 is set as Vgs, and when the output voltage becomes $Vgs^{-1}$ Vz (zener breakdown voltage of the zener diode)+VF (forward voltage of about 0.7 V of the diode), the NMOS transistor M12 absorbs the voltage from the motor so that the output voltage does not become larger than Vgs. Therefore, the output voltage of the clamp circuit is clamped at around Vgs+Vz+VF (=about 10 V).

Figure 6:
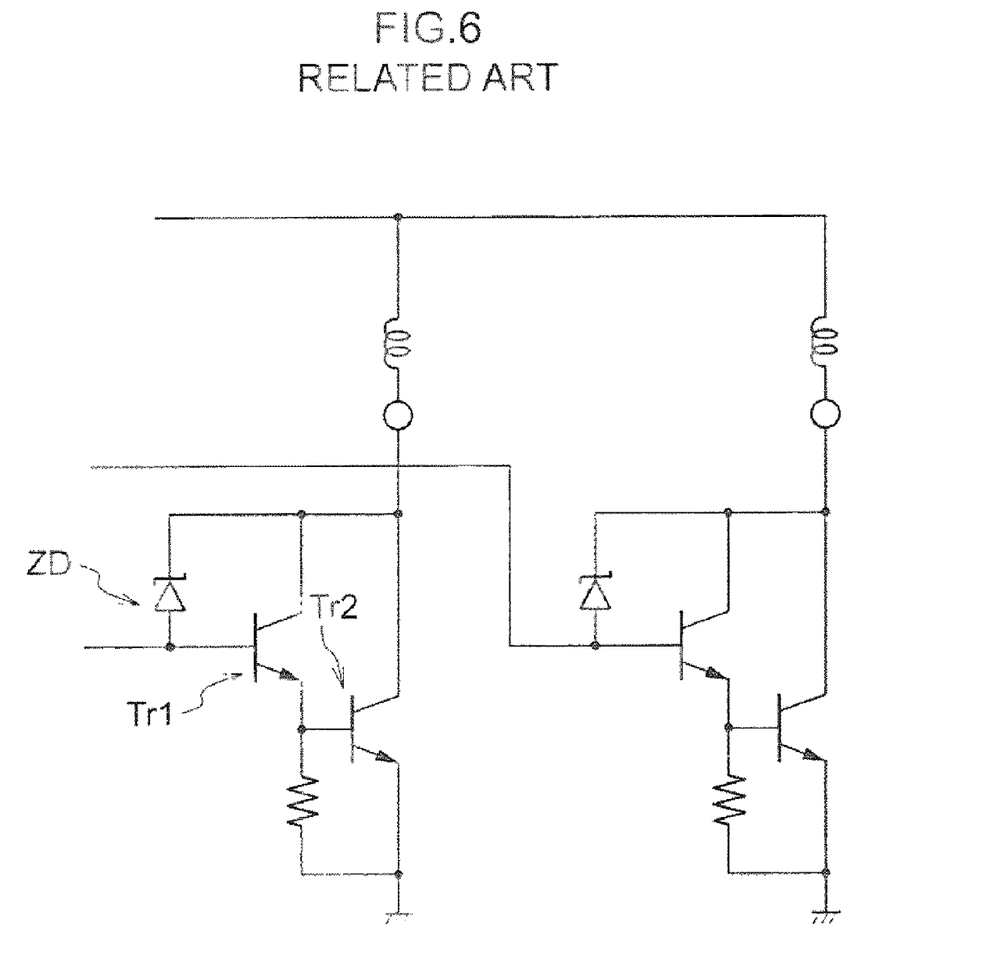
FIG. 6 is a circuit diagram showing the configuration of an output circuit of a two-phase half-wave motor in a related art.
Figure 7:
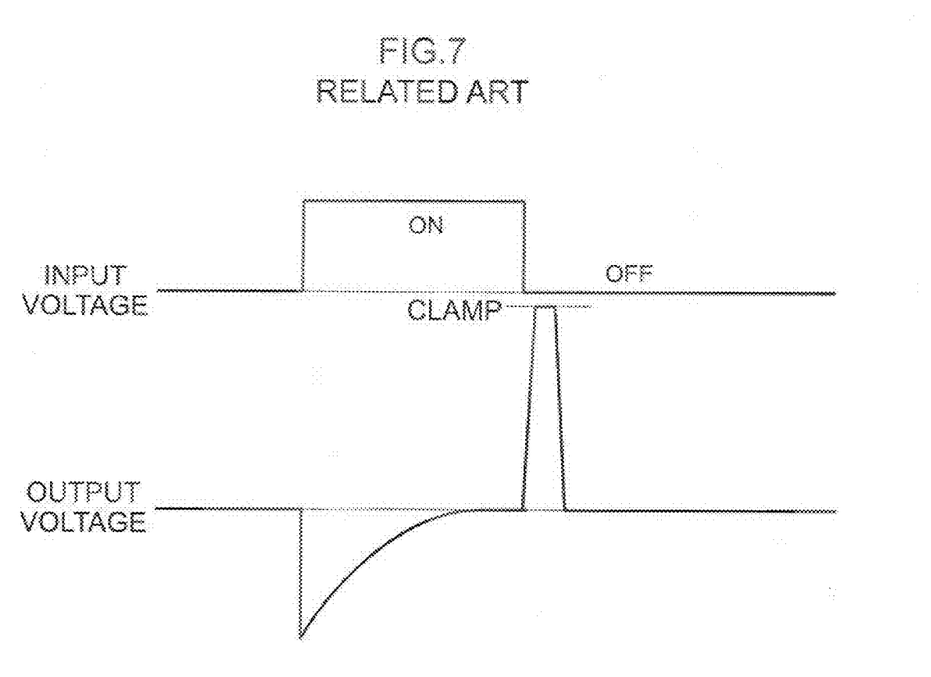
FIG. 7 is a time chart showing changes in input and output voltages of an output circuit of the two-phase half-wave motor in a related art.

Further, an output circuit of a two-phase half-wave motor has been known (for example, Japanese Patent No. 2,771,605). As shown in FIG. 6, this output circuit uses a bipolar transistor, and drives a motor by connecting emitter of the bipolar transistor to ground. In this output circuit, the output voltage becomes equal to or more than a source voltage, at the moment when transistors Tr1 and Tr2 are turned off. However, in this output circuit, to prevent the above, a zener diode ZD is inserted between an output and the base. As shown in FIG. 7, in this output circuit, when the output voltage becomes "Vz (zener breakdown voltage of the zener diode)+ 2×VF (forward voltage of about 0.7 V of the diode)", the transistors Tr1 and Tr2 which are in an off state are turned to an on state, and the output voltage can be suppressed.

However, in the technologies disclosed in the Japanese Patent No. 4,084,117 and Japanese Patent No. 2,771,605, the clamp voltage is constant, even when the source voltage of the motor changes. Due thereto, in the above described technologies, setting of the clamp voltage is not flexible, and, for example, when the set clamp voltage becomes larger than the source voltage, regenerated current flows into the power source, and the source voltage becomes fluctuate.

INTRODUCTION TO THE INVENTION

The present disclosure provides a brushless motor driving circuit capable of clamping an output voltage at a proper voltage, even when source voltage changes.

A first aspect of the present disclosure is a brushless motor driving circuit including: a drive voltage generating circuit that includes a switching element group including ground-side switching elements having one end there of connected to an output terminal connected to one end of a coil of a brushless motor and the other end thereof grounded, that generates a voltage for driving the brushless motor from a source voltage by turning on/off the switching element group, and that applies the generated voltage to the coil; a drive control circuit that turns on/off the switching element group; and a clamp circuit that turns on/off the ground-side switching elements so that an output voltage becomes equal to or lower than the source voltage, based on the output voltage at the output terminal and the source voltage.

In the brushless motor driving circuit according to the first aspect of the present disclosure, the switching element group of the drive voltage generating circuit is turned on/off by the drive control circuit. Accordingly, the voltage for driving the brushless motor is generated from the source voltage. Then, the generated voltage is applied to the coil of the brushless motor. Based on the output voltage at the output terminal and the source voltage, the clamp circuit turns on/off a ground-side switching element so that the output voltage becomes equal to or lower than a voltage of the source voltage.

As described above; the clamp circuit in the first aspect clamps so that the output voltage becomes equal to or lower than a voltage of the source voltage, based on the output voltage at the output terminal and the source voltage. Therefore, in the first aspect of the disclosure, the output voltage can be clamped at the proper voltage, even when the source voltage changes.

In a second aspect of the disclosure, in the first aspect, the drive voltage generating circuit may include, as the switching element group, an inverter circuit including a P-type MOSFET to which the source voltage is supplied from a source terminal and an N-type MOSFET whose source terminal is grounded, which are connected in series, a connection point of the P-type MOSFET and the N-type MOSFET being connected to the output terminal, and when the output voltage and the source voltage are input, and the output voltage is the voltage that corresponds to the source voltage, the clamp circuit turns on the N-type MOSFET.

In a third aspect of the disclosure, in the first aspect, the drive voltage generating circuit may include, as the switching element group, a series circuit including a first N-type MOSFET to which the source voltage is supplied from a drain terminal and a second N-type MOSFET whose source terminal is grounded, which are connected in series, a connection point of the first N-type MOSFET and the second N-type MOSFET being connected to the output terminal, and when the output voltage and the source voltage are input, and the output voltage is the voltage that corresponds to the source voltage, the clamp circuit turns on the second N-type MOSFET.

In a fourth aspect of the disclosure, in the second aspect, the drive voltage generating circuit may be an H bridge circuit including two inverter circuits, which are a first inverter circuit and a second inverter circuit, and two output terminals, which are a first output terminal and a second output terminal, wherein the first output terminal, to which the connection point of the first inverter circuit is connected, is connected to the one end of the coil, and the second output terminal, to which the connection point of the second inverter circuit is connected, is connected to the other end of the coil, and wherein the clamp circuit may turn on the N-type MOSFET in the first inverter circuit when the output voltage at the first output terminal and the source voltage are input to the first inverter circuit and the output voltage is the voltage that corresponds to the source voltage, and may turn on the N-type MOSFET in the second inverter circuit when the output voltage at the second output terminal and the source voltage are input to the second inverter circuit, and the output voltage is the voltage that corresponds to the source voltage.

In a fifth aspect, in the third aspect, the drive voltage generating circuit may be an H bridge circuit including two series circuits, which are a first series circuit and a second series circuit, and two output terminals, which are a first output terminal and a second output terminal, wherein the first output terminal, to which the connection point of the first series circuit is connected, is connected to the one end of the coil, and the second output terminal, to which the connection point of the second series circuit is connected, is connected to the other end of the coil, and wherein the clamp circuit may turn on the second N-type MOSFET in the first series circuit when the output voltage at the first output terminal and the source voltage are input to the first series circuit, and the output voltage is the voltage that corresponds to the source voltage, and may turn on the second N-type MOSFET in the second series circuit when the output voltage at the second output terminal and the source voltage are input to the second series circuit, and the output voltage is the voltage that corresponds to the source voltage.

As described above, in the brushless motor driving circuit of the present disclosure, the clamp circuit clamps so that the output voltage is equal to or lower than a voltage of the source voltage, based on the output voltage at the output terminal and the source voltage. Accordingly, the brushless motor driving circuit of the present disclosure can clamp the output voltage to the proper voltage, even when the source voltage changes.

BRIEF DESCRIPTION OF THE DRAWINGS

Exemplary embodiments of the present disclosure will be described in detail based on the following figures, wherein.

DETAILED DESCRIPTION

The exemplary embodiments of the present disclosure are described and illustrated below to encompass brushless motor driving circuit and a brushless motor driving circuit including a clamp circuit that clamps an output voltage output to a coil of a brushless motor. Of course, it will be apparent to those of ordinary skill in the art that the preferred embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure. Hereinafter, an exemplary embodiment of the present disclosure will be described in detail with reference to the drawings.

Figure 1:
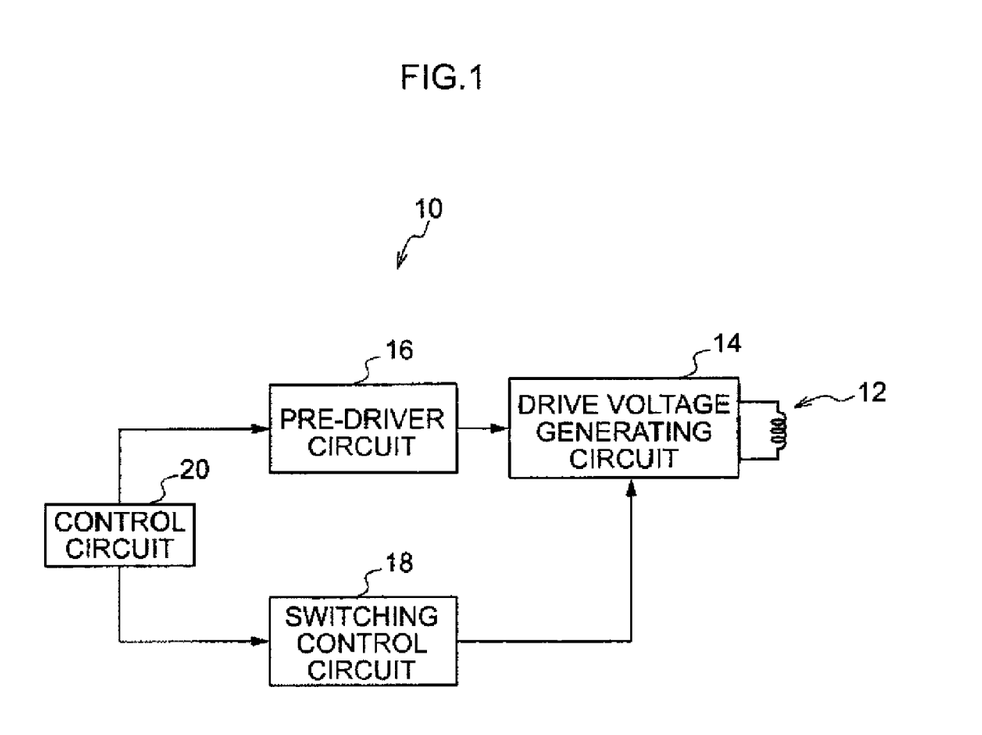
FIG. 1 is a schematic diagram showing a configuration of a brushless motor driving apparatus, according to a first exemplary embodiment of the present disclosure.

As shown in FIG. 1, a brushless motor driving apparatus 10 according to a first exemplary embodiment includes a coil 12, a drive voltage generating circuit 14, a pre-driver circuit 16, a switching control circuit 18, and a control circuit 20. The coil 12 is provided in the brushless motor, generates a magnetic field, and rotates a rotor. The drive voltage generating circuit 14 generates a drive voltage which is applied to the coil 12. The pre-driver circuit 16 is a drive control circuit which turns on/off an MOSFET in the drive voltage generating circuit 14. The switching control circuit 18 controls on/off of a switching element in the clamp circuit provided in the drive voltage generating circuit 14. The control circuit 20 controls the operation of the pre-driver circuit 16 and the operation of the switching control circuit 18.

Figure 2:
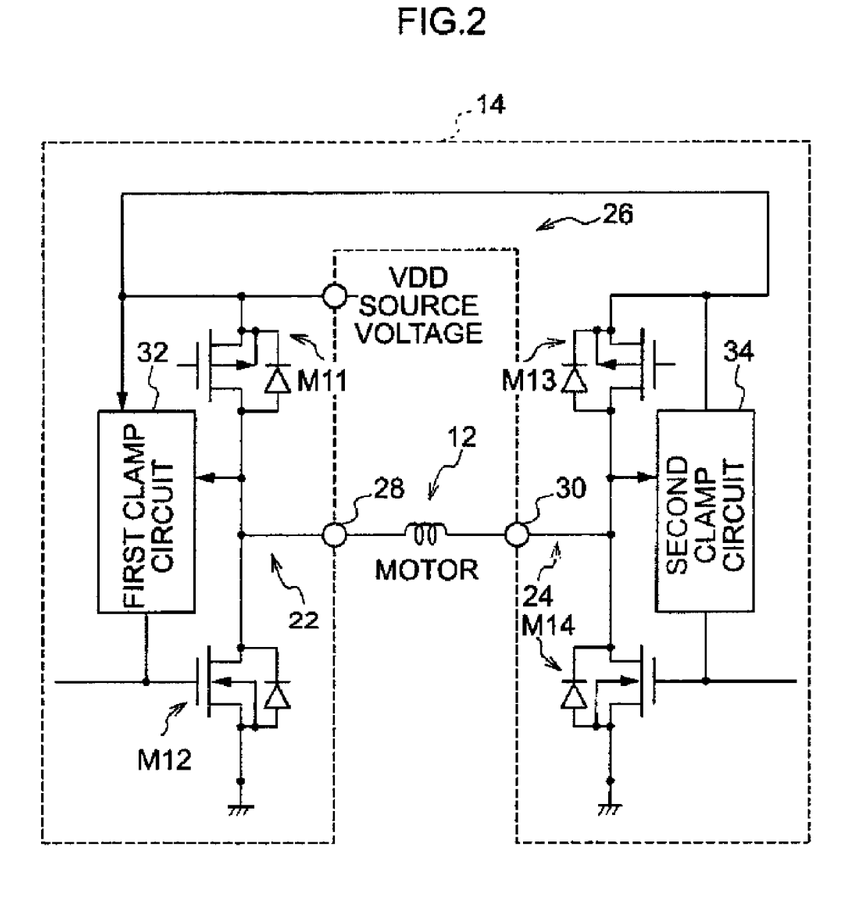
FIG. 2 is a circuit diagram showing the configuration of a drive voltage generating circuit of the brushless motor driving apparatus, according to the first exemplary embodiment of the present disclosure.

As shown in FIG. 2, the drive voltage generating circuit 14 includes an H bridge circuit 26 configured by using a first inverter circuit 22 and a second inverter circuit 24. The first inverter circuit 22 is configured by connecting the PMOS transistor M11 and the NMOS transistor M12 in series. The second inverter circuit 24 is configured by connecting a PMOS transistor M13 and an NMOS transistor M14 in series. The source terminals of the PMOS transistors M11 and M13 are connected to a power supply VDD. The source terminals of the NMOS transistors M12 and M14 are grounded. A connection point of the PMOS transistor M11 and the NMOS transistor M12 of the first inverter circuit 22 is connected to one end of the coil 12 via an output terminal 28. Further, a connection point of the PMOS transistor M13 and the NMOS transistor M14 of the second inverter circuit 24 is connected to the other end of the coil 12 via an output terminal 30. Note that, the NMOS transistors M12 and M14 correspond to the ground-side switching elements.

When the PMOS transistor M11 and the NMOS transistor M14 are turned on, the source voltage from the power supply VDD is applied in a first direction to the coil 12. Further, when the PMOS transistor M13 and the NMOS transistor M12 are turned on, the source voltage from the power supply VDD is applied in the direction opposite to the first direction. By supplying the source voltages alternately to the coil 12, the drive voltage generating circuit 14 operates as a single-phase full-wave motor driving circuit.

The drive voltage generating circuit 14 further includes a first clamp circuit 32 and a second clamp circuit 34. To the first clamp circuit 32, the source voltage from the power supply VDD and output voltage of the output terminal 28 are supplied. The first clamp circuit 32 monitors the source voltage and the output voltage, and turns on/off the NMOS transistor M12 so that the output voltage becomes a voltage (a voltage corresponding to the source voltage) close to or lower than the source voltage. To the second clamp circuit 34, the source voltage from the power supply VDD and the output voltage at the output terminal 30 are supplied. The second clamp circuit 34 monitors the source voltage and the output voltage and turns on/off the NMOS transistor M14 so that the output voltage becomes a voltage (a voltage corresponding to the source voltage) close to or lower than the source voltage.

Figure 3:
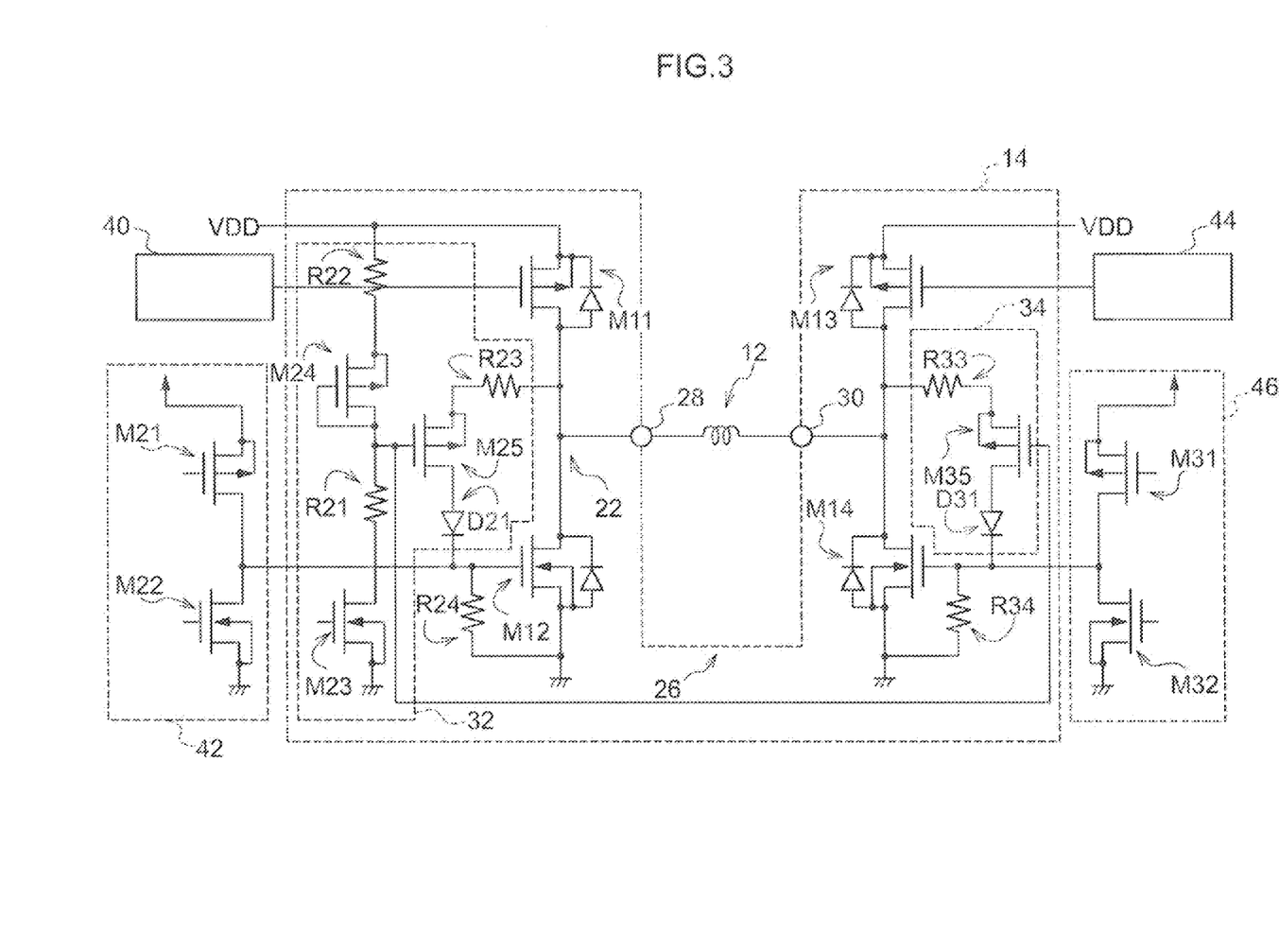
FIG. 3 is a circuit diagram showing the configuration of the drive voltage generating circuit and a clamp circuit of the brushless motor driving apparatus, according to the first exemplary embodiment of the present disclosure.

Next, circuit configuration of the first and second clamp circuits 32 and 34 will be described in detail.

As shown in FIG. 3, the first clamp circuit 32 is configured by including a circuit where a resistive element R22, a PMOS transistor M24, a resistive element R21, and an NMOS transistor M23 are connected in series, and by including a circuit where a resistive element R23, a PMOS transistor M25, and a diode D21 are connected in series.

One end of the resistive element R22 is connected to the power supply VDD. Further, the other end of the resistive element R22 is connected to the source terminal of the PMOS transistor M24. One end of the resistive element R21 is connected to the gate terminal of the PMOS transistor M24. Further, the other end of the resistive element R21 is connected to the drain terminal of the NMOS transistor M23. The gate terminal of the PMOS transistor M24 is connected to the drain terminal. Further, the source terminal of the NMOS transistor M23 is grounded.

One end of the resistive element R23 is connected to the output terminal 28. Further, the other end of the resistive element R23 is connected to the source terminal of the PMOS transistor M25. The anode terminal of the diode D21 is connected to the drain terminal of the PMOS transistor M25. Further, the cathode terminal of the diode D21 is connected to the gate terminal of the NMOS transistor M12. The gate terminal of the PMOS transistor M25 is connected to the drain terminal of the PMOS transistor M24.

The second clamp circuit 34 includes a circuit where a resistive element R33, a PMOS transistor M35, and a diode D31 are connected in series. One end of the resistive element R33 is connected to the output terminal 30. Further, the other end of the resistive element R33 is connected to the source terminal of the PMOS transistor M35. The anode terminal of the diode D31 is connected to the drain terminal of the PMOS transistor M35. Further, the cathode terminal of the diode D31 is connected to the gate terminal of the NMOS transistor M14. The gate terminal of the PMOS transistor M35 is connected to the drain terminal of the PMOS transistor M24 of the first clamp circuit 32.

The gate terminal of the PMOS transistor M11 is connected to the output terminal of a first pre-driver 40 of the pre-driver circuit 16. The gate terminal of the NMOS transistor M12 is connected to the output terminal of a second pre-driver 42 of the pre-driver circuit 16.

The gate terminal of the PMOS transistor M13 is connected to the output terminal of a third pre-driver 44 of the pre-driver circuit 16. Further, the gate terminal of the NMOS transistor M14 is connected to the output terminal of a fourth pre-driver 46 of the pre-driver circuit 16.

The first pre-driver 40 of the pre-driver circuit 16 is configured by, for example, an inverter circuit. The first pre-driver 40 outputs a pulse-waveform drive signal to turn on/off the PMOS transistor M11, in accordance with a control signal from the control circuit 20. The second pre-driver 42 of the pre-driver circuit 16 is configured by an inverter circuit where the PMOS transistor M21 and the NMOS transistor M22 are connected in series. In a manner similar to the first pre-driver 40, the second pre-driver 42 outputs a pulse-waveform drive signal to turn on/off the NMOS transistor M12, in accordance with a control signal from the control circuit 20.

The third pre-driver 44 of the pre-driver circuit 16 is configured by, for example, an inverter circuit. The third pre-driver 44 outputs a pulse-waveform drive signal to turn on/off the PMOS transistor M13, in accordance with a control signal from the control circuit 20. The fourth pre-driver 46 of the pre-driver circuit 16 is configured by an inverter circuit where the PMOS transistor M31 and the NMOS transistor M32 are connected in series. In a manner similar to the third pre-driver 44, the fourth pre-driver 46 outputs a pulse-waveform drive signal to turn on/off the NMOS transistor M14, in accordance with a control signal from the control circuit 20.

The gate terminal of the NMOS transistor M23 is connected to the output terminal of the switching control circuit 18. The NMOS transistor turns on/off according to a drive signal from the switching control circuit 18.

Hereinafter, the operation of the brushless motor driving apparatus 10 according to the first exemplary embodiment will be described. First, the control circuit 20 outputs a control signal to the pre-driver circuit 16 to output a drive signal from the pre-driver circuit 16. Next, the first pre-driver 40 to the fourth pre-driver 46 of the pre-driver circuit 16 output pulse-wave drive signals of the high and low levels.

By the drive signals, the PMOS transistors M11 and M13 and the NMOS transistors M12 and M14 are turned on/off, so that the on state of the PMOS transistor M11 and the NMOS transistor M14 and the on state of the PMOS transistor M13 and the NMOS transistor M12 are repeated alternately. Due thereto, as described above, bidirectional currents are alternately supplied to the coil 12.

In a case when the current is flowing from the PMOS transistor M13 to the NMOS transistor M12, to switch the direction of current flowing in the coil 12, the PMOS transistor M13 and the NMOS transistor M12 are turned off. In this case, a state where all of the PMOS transistors M11 and M13 and the NMOS transistors M12 and M14 are turned off, occurs. When this state occurs, for example, the drain voltage (output voltage) of the NMOS transistor M12 sharply rises.

When there is no clamp circuit for clamping output voltage, the output voltage becomes larger than the source voltage, and due thereto, regenerated current flows into the power source VDD via a parasitic diode of the PMOS transistor M11. As a result, ripples occur in the source voltage.

In the first exemplary embodiment, when the PMOS transistors M11 and M13 and the NMOS transistors M12 and M14 are in the off state, the control circuit 20 controls the switching control circuit 18 to output a high-level drive signal to turn on the NMOS transistor M23.

The gate terminal of the PMOS transistor M24 is grounded via the resistive element R21 and the PMOS transistor M23. Accordingly, the transistor M24 is turned on. Next, the gate voltage of the PMOS transistors M25 and M35 is biased by the resistive elements R21 and R22 and the PMOS transistor M24.

In this state, when the output voltage at the output terminal 28 becomes a voltage close to and lower than the source voltage, the PMOS transistor M25 is turned on and becomes conductive. Accordingly, the output voltage at the output terminal 28 biases the gate voltage of the NMOS transistor M12 via the resistive element R23. Due thereto, the NMOS transistor M12 is turned on and becomes conductive. Therefore, the brushless motor driving apparatus 10 according to the first exemplary embodiment can pass motor current from the coil 12 to the ground side via the NMOS transistor M12, without flowing to the power supply VDD side. Accordingly, the brushless motor driving apparatus 10 according to the first exemplary embodiment can clamp the output voltage to a predetermined voltage equal to or lower than the source voltage (a voltage close to the source voltage).

Further, in a case when the current flows from the PMOS transistor M11 to the NMOS transistor M14, to switch the direction of current flowing in the coil 12, both of the PMOS transistor M11 and the NMOS transistor M14 are turned off.

In this case, a state where all of the PMOS transistors M11 and M13 and the NMOS transistors M12 and M14 are turned off occurs.

As described above, when the PMOS transistors M11 and M13 and the NMOS transistors M12 and M14 are in the off state, the control circuit 20 controls the switching control circuit 18 to output a high-level drive signal to turn on the NMOS transistor M23. Accordingly, the transistor M24 is turned on and, by the resistive elements R21 and R22 and the PMOS transistor M24, the gate voltage of the PMOS transistors M25 and M35 are biased.

In this state, when the output voltage at the output terminal 30 becomes a voltage close to and lower than the source voltage, the PMOS transistor M35 is turned on and becomes conductive. Accordingly, the output voltage at the output terminal 30 biases the gate voltage of the NMOS transistor MI4 via the resistive element R33. Due thereto, the NMOS transistor M14 is turned on and becomes conductive. Therefore, the brushless motor driving apparatus 10 according to the first exemplary embodiment can pass the motor current from the coil 12 to the ground side via the NMOS transistor M14, without flowing to the power source VDD side. Accordingly, the brushless motor driving apparatus 10 according to the first exemplary embodiment can clamp output voltage at a voltage close to and lower than the source voltage.

The brushless motor driving apparatus 10 according to the first exemplary embodiment operates as described above even when the source voltage changes. Accordingly, the brushless motor driving apparatus 10 according to the first exemplary embodiment can clamp the output voltage at the output terminal 28 or 30 to the source voltage or a voltage close to and lower than the source voltage, even the source voltage has changed.

As described above, in the brushless motor driving apparatus 10 according to the first exemplary embodiment, when the output voltage is close to the source voltage, the NMOS transistor on the ground side is turned on by the clamp circuit to which the output voltage at the output terminal and the source voltage are supplied. Accordingly, the brushless motor driving apparatus 10 according to the first exemplary embodiment can clamp the output voltage close to the source voltage. Therefore, the brushless motor driving apparatus 10 according to the first exemplary embodiment can clamp the output voltage to proper voltage even when the source voltage changes.

The brushless motor driving apparatus 10 according to the first exemplary embodiment can clamp the output voltage at a voltage close to the source voltage, regardless to the change of the source voltage, and therefore can prevent the regenerated current to flow into the power supply. Accordingly, the brushless motor driving apparatus 10 according to the first exemplary embodiment can eliminate a ripple component in the power supply.

Next, a brushless motor driving circuit according to the second exemplary embodiment will be described. The same reference numeral is designated to a part similar to that of the first exemplary embodiment, and description thereof will be omitted.

The second exemplary embodiment is different from the first exemplary embodiment mainly with respect to the point that an NMOS transistor is used as a power transistor at the high side.

Figure 4:
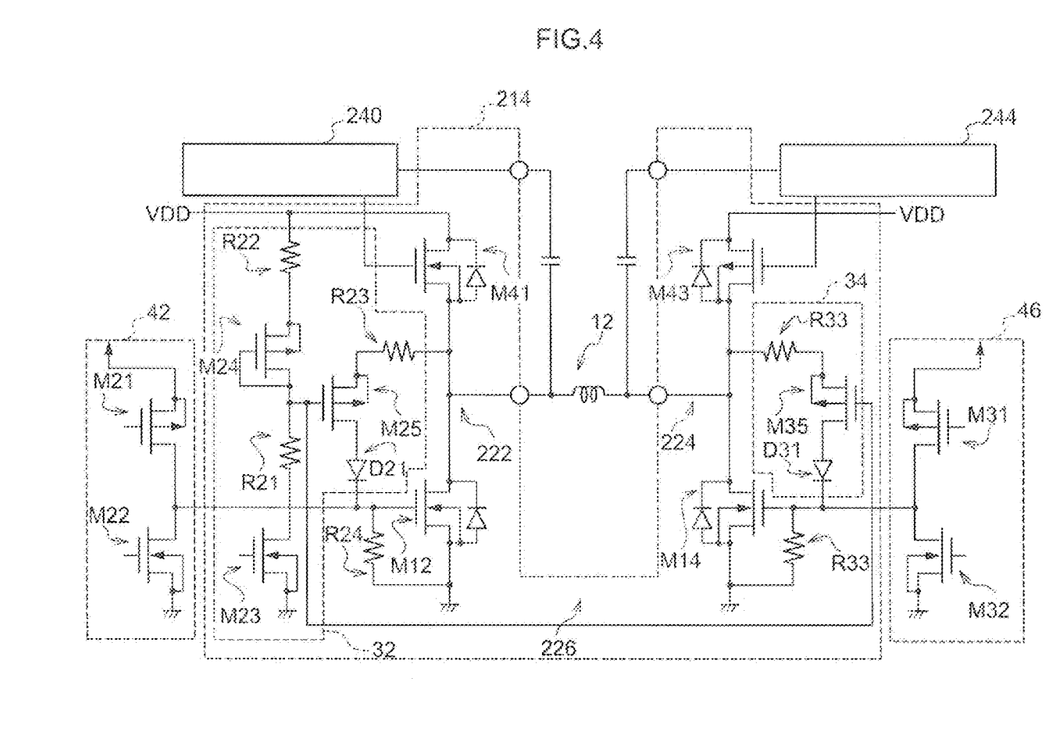
FIG. 4 is a circuit diagram showing a configuration of a drive voltage generating circuit and a clamp circuit of a brushless motor driving apparatus according to a second exemplary embodiment of the present disclosure.

As shown in FIG. 4, a drive voltage generating circuit 214 of the brushless motor driving apparatus according to the second exemplary embodiment includes an H bridge circuit 226 configured by using a first series circuit 222 and a second series circuit 224. In the first series circuit 222, an NMOS transistor M41 and the NMOS transistor M12 are connected in series. In the second series circuit 224, an NMOS transistor M43 and the NMOS transistor M14 are connected in series.

The drain terminals of the NMOS transistors M41 and M43 are connected to the power supply VDD. Further, the source terminals of the NMOS transistors M12 and M14 are grounded. A connection point between the NMOS transistors M41 and M12 of the first series circuit 222 is connected to one end of the coil 12 via the output terminal 28. Further, a connection point between the NMOS transistors M43 and M14 of the second series circuit 224 is connected to the other end of the coil 12 via the output terminal 30.

When the NMOS transistors M41 and M14 are turned on, the source voltage from the power supply VDD is applied in the first direction to the coil 12. When the NMOS transistors M43 and M12 are turned on, the source voltage from the power supply VDD is applied in the direction opposite to the first direction to the coil 12. Due thereto, by alternately supplying the power, the drive voltage generating circuit 214 operates as a single-phase full-wave motor driving circuit.

Note that, the configuration of the first and second clamp circuits 32 and 34 is similar to that of the first exemplary embodiment.

The gate terminal of the NMOS transistor M41 is connected to the output terminal of a first pre-driver 240 of the pre-driver circuit 16. The first pre-driver 240 is configured by using a boot strap circuit for obtaining the gate voltage of the NMOS transistor M41 as a high-side power transistor.

The gate terminal of the NMOS transistor M43 is connected to the output terminal of a third pre-driver 244 of the pre-driver circuit 16. The third pre-driver 244 is configured by using a bootstrap circuit for obtaining the gate voltage of the N-type MOS transistor M43 as a high-side power transistor.

Next, the operation of the brushless motor driving apparatus according to the second exemplary embodiment will be described. First, the control circuit 20 outputs a control signal to the pre-driver circuit 16 to output a drive signal from the pre-driver circuit 16. From the first to fourth pre-drivers 240 to 46 in the first pre-driver circuit 16, pulse-wave drive signals of high and low levels are output.

By the drive signals, the on state of the NMOS transistors M41 and M14 and the on state of the NMOS transistors M43 and M12 are repeated alternately. Due thereto, the brushless motor driving apparatus according to the second exemplary embodiment turns on/off the NMOS transistors M41, M12, M43, and M14 to alternately supply bidirectional currents to the coil 12.

In a case when the current flows from the NMOS transistor M43 to the NMOS transistor M12, to switch the direction of current flowing in the coil 12, the NMOS transistors M43 and M12 are turned off. In this case, a state where all of the NMOS transistors M41, M12, M43, and M14 are turned off occurs. In this state, the drain voltage of the NMOS transistor M12 sharply rises.

When the NMOS transistors M41, M12, M43, and M14 are in the off state, the control circuit 20 controls the switching control circuit 18 to output a high-level drive signal to turn on the NMOS transistor M23.

The gate terminal of the PMOS transistor M24 is grounded via the resistive element R21 and the PMOS transistor M23. Due thereto, the PMOS transistor M24 is turned on, and the gate voltage of the PMOS transistors M25 and M35 is biased by the resistive elements R21 and R22 and the PMOS transistor M24.

In this state, when the output voltage at the output terminal 28 becomes a voltage close to and lower than the source voltage, the PMOS transistor M25 becomes conductive.

Accordingly, the output voltage at the output terminal 28 biases the gate voltage of the NMOS transistor M12 via the resistive element R23. Due thereto, the NMOS transistor M12 is turned on and becomes conductive. Therefore, the brushless motor driving apparatus according to the second exemplary embodiment can pass motor current from the coil 12 to the ground side via the NMOS transistor M12. Accordingly, the brushless motor driving apparatus according to the second exemplary embodiment can clamp the output voltage at a voltage close to and lower than the source voltage.

When the current flows from the NMOS transistor M41 to the NMOS transistor M14, the brushless motor driving apparatus according to the second exemplary embodiment switches the direction of current flowing in the coil 12. Accordingly, when both of the NMOS transistors M41 and M14 are turned off, a state where all of the NMOS transistors M41, M12, M43, and M14 are turned off occurs.

As described above, when the NMOS transistors M41, M12, M43, and M14 are in the off state, the control circuit 20 controls the switching control circuit 18 to output a high-level drive signal to turn on the NMOS transistor M23. Further, the transistor M24 is turned on and, by the resistive elements R21 and R22 and the PMOS transistor M24, the gate voltage of the PMOS transistors M25 and M35 are biased.

In this state, when the output voltages at the output terminal 30 becomes a voltage close to and lower than the source voltage, the PMOS transistor M35 becomes conductive. Accordingly, the output voltage at the output terminal 30 biases the gate voltage of the NMOS transistor M14 via the resistive element R33. Due thereto, the NMOS transistor M14 becomes conductive. Therefore, the brushless motor driving apparatus according to the second exemplary embodiment can pass the motor current from the coil 12 to the ground side via the NMOS transistor M14. Accordingly, the brushless motor driving apparatus according to the second exemplary embodiment can clamp output voltage at a voltage close to and lower than the source voltage.

The brushless motor driving apparatus according to the second exemplary embodiment operates as described above, even when the source voltage changes. Accordingly, the brushless motor driving apparatus according to the second exemplary embodiment can clamp the output voltage at the output terminal 28 or 30 to the source voltage or a voltage close and lower than the source voltage, even the source voltage has changed.

As described above, in the brushless motor driving apparatus according to the second exemplary embodiment, when the output voltage is a voltage close to the source voltage, the NMOS transistor on the ground side is turned on by the clamp circuit to which the output voltage at the output terminal and the source voltage are supplied. Accordingly, the brushless motor driving apparatus according to the second exemplary embodiment can clamp the output voltage close to the source voltage. Therefore, the brushless motor driving apparatus according to the second exemplary embodiment can clamp the output voltage to proper voltage even when the source voltage changes.

The brushless motor driving apparatus according to the second exemplary embodiment can clamp the output voltage at a voltage close to the source voltage, regardless to the change of the source voltage, and therefore can prevent the regenerated current to flow into the power supply. Accordingly, the brushless motor driving apparatus according to the second exemplary embodiment can eliminate a ripple component in the power supply.

In the first and second exemplary embodiments, a cast where generating the brushless motor drive voltage by using the II bridge circuit using the inverter circuits, or the bridge circuit using the series circuits of the NMOS transistors, has been described. However, the present invention is not limited thereto. The drive voltage may be generated by other circuit configurations. In this case as well, it is sufficient to construct the clamp circuit so that the voltage at the output terminal and the source voltage are input to the clamp circuit and, when the output voltage becomes close to the source voltage, the switching element on the ground side is turned on to make the voltage from the motor escapes to the ground side.

Further, a case where constructing the drive voltage generating circuit by a switching element group using PMOS transistors and NMOS transistors, has been described. However, the present invention is not limited thereto. The drive voltage generating circuit may be configured by a switching element group using a bipolar transistor and a thyristor.

The circuit configuration of the clamp circuit of the present invention is not limited to those of the above exemplary embodiments. For example, the source voltage in the first and second clamp circuits may not be input commonly. Also in the second clamp circuit, the source voltage may be input like in the first clamp circuit. In this case, it is sufficient to provide a circuit similar to the series circuit of the resistive element R22, the PMOS transistor M24, the resistive element R21, and the PMOS transistor M23 of the first clamp circuit also for the second clamp circuit.

Following from the above description and embodiment, it should be apparent to those of ordinary skill in the art that, while the foregoing constitutes an exemplary embodiment of the present disclosure, the disclosure is not necessarily limited to this precise embodiment and that changes may be made to this embodiment without departing from the scope of the invention as defined by the claims. Additionally, it is to be understood that the invention is defined by the claims and it is not intended that any limitations or elements describing the exemplary embodiment set forth herein are to be incorporated into the interpretation of any claim element unless such limitation or element is explicitly stated. Likewise, it is to be understood that it is not necessary to meet any or all of the identified advantages or objects of the disclosure discussed herein in order to fall within the scope of any claims, since the invention is defined by the claims and since inherent and/or unforeseen advantages of the present disclosure may exist even though they may not have been explicitly discussed herein.

What is claimed is:

1. A brushless motor driving circuit comprising:
   a drive voltage generating circuit that includes a switching element group including ground-side switching elements having one end there of connected to an output terminal connected to one end of a coil of a brushless motor and the other end thereof grounded, that generates a voltage for driving the brushless motor from a source voltage by turning on/off the switching element group, and that applies the generated voltage to the coil;
   a drive control circuit that turns on/off the switching element group; and
   a clamp circuit that turns on/off the ground-side switching elements so that an output voltage becomes equal to or lower than the source voltage, based on the output voltage at the output terminal and the source voltage; wherein:
   the drive voltage generating circuit includes, as the switching element group, an inverter circuit including a P-type MOSFET to which the source voltage is supplied from a source terminal and an N-type MOSFET whose source terminal is grounded, which are connected in series, a connection point of the P-type MOSFET and the N-type MOSFET being connected to output terminal;

when the output voltage and the source voltage are input, and the output voltage is the voltage that corresponds to the source voltage, the clamp circuit turns on the N-type MOSFET;

the drive voltage generating circuit is an H bridge circuit including two inverter circuits, which are a first inverter circuit and a second inverter circuit, and two output terminals, which are a first output terminal and a second output terminal, wherein the first output terminal, to which the connection point of the first inverter circuit is connected, is connected to the one end of the coil, and the second output terminal, to which the connection point of the second inverter circuit is connected, is connected to the other end of the coil; and the clamp circuit turns on the N-type MOSFET in the first inverter circuit when the output voltage at the first output terminal and the source voltage are input to the first inverter circuit and the output voltage is the voltage that corresponds to the source voltage, and turns on the N-type MOSFET in the second inverter circuit when the output voltage at the second output terminal and the source voltage are input to the second inverter circuit, and the output voltage is the voltage that corresponds to the source voltage.

2. A brushless motor driving circuit comprising:

a drive voltage generating circuit that includes a switching element group including around-side switching elements having one end there of connected to an output terminal connected to one end of a coil of a brushless motor and the other end thereof grounded, that generates a voltage for driving the brushless motor from a source voltage by turning on/off the switching element group, and that applies the generated voltage to the coil;

a drive control circuit that turns on/off the switching element group; and a clamp circuit that turns on/off the ground-side switching elements so that an output voltage becomes equal to or lower than the source voltage, based on the output voltage at the output terminal and the source voltage; wherein:

the drive voltage generating circuit includes, as the switching element group, a series circuit including a first N-type MOSFET to which the source voltage is supplied from a drain terminal and a second N-type MOSFET whose source terminal is grounded, which are connected in series, a connection point of the first N-type MOSFET and the second N-type MOSFET being connected to the output terminal;

when the output voltage and the source voltage are input, and the output voltage is the voltage that corresponds to the source voltage, the clamp circuit turns on the second N-type MOSFET;

the drive voltage generating circuit is an H bridge circuit including two series circuits, which are a first series circuit and a second series circuit, and two output terminals, which are a first output terminal and a second output terminal, wherein the first output terminal, to which the connection point of the first series circuit is connected, is connected to the one end of the coil, and the second output terminal, to which the connection point of the second series circuit is connected, is connected to the other end of the coil; and the clamp circuit turns on the second N-type MOSFET in the first series circuit when the output voltage at the first output terminal and the source voltage are input to the first series circuit, and the output voltage is the voltage that corresponds to the source voltage, and turns on the second N-type MOSFET in the second series circuit when the output voltage at the second output terminal and the source voltage are input to the second series circuit, and the output voltage is the voltage that corresponds to the source voltage.

* * * * *